(12) United States Patent
Gerth et al.

(10) Patent No.: US 6,370,373 B1
(45) Date of Patent: Apr. 9, 2002

(54) SYSTEM AND METHOD FOR DETECTING CLONING FRAUD IN CELLULAR/PCS COMMUNICATIONS

(75) Inventors: Donald M. Gerth, Dublin; Yogeesh H. Kamath, Gahanna, both of OH (US); Timothy J. Rooney, Ocean, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 08/344,390

(22) Filed: Nov. 23, 1994

(51) Int. Cl.[7] ............................................... H04M 1/66
(52) U.S. Cl. ........................ 455/410; 455/411; 455/435; 380/250
(58) Field of Search .............................. 379/59, 60, 62; 455/33.1, 33.2, 54.2, 56.1, 410, 411, 435; 380/21, 23, 250, 258, 279

(56) References Cited

U.S. PATENT DOCUMENTS

| 4,876,738 A | * | 10/1989 | Selby ........................ 379/59 X |
| 5,077,790 A | * | 12/1991 | D'Amico et al. ......... 379/62 X |
| 5,243,652 A | * | 9/1993 | Teare et al. .................... 380/21 |
| 5,335,265 A | * | 8/1994 | Cooper et al. ................ 379/59 |
| 5,335,278 A | * | 8/1994 | Matchett et al. .............. 380/23 |
| 5,345,595 A | * | 9/1994 | Johnson et al. ............... 379/60 |
| 5,455,863 A | * | 10/1995 | Brown et al. .......... 455/33.1 X |
| 5,475,735 A | * | 12/1995 | Williams et al. .............. 379/59 |
| 5,535,431 A | * | 7/1996 | Grube et al. ........... 455/33.1 X |

OTHER PUBLICATIONS

"Straw Man for Automatic Roaming", Electronic Industries Association Working Group II, Jun. 18, 1985.*

* cited by examiner

*Primary Examiner*—Nay Maung
*Assistant Examiner*—Quochien B. Vuong
(74) *Attorney, Agent, or Firm*—Oliff & Berridge

(57) ABSTRACT

A system and method for proactively detecting cloning fraud in a cellular mobile telephone environment are discussed. Information is collected which corresponds to registration notifications of the cellular telephones as they operate within the cellular mobile telephone environment. The registration information is used to detect time-space peculiarities. Specifically, registrations having the same mobile identification number and occurring in different mobile switching centers within a predetermined time interval are identified. This time interval, based on a reasonable travel time between cells covered by the different mobile switching centers where the registrations originated, is used as a threshold for detecting cloning fraud.

20 Claims, 6 Drawing Sheets

FIG. 6

| FIRST REGNOT ORIGINATING MSC \ SECOND REGNOT ORIGINATING MSC | MSC A | MSC B | MSC C | MSC D | MSC E | MSC F | MSC G |
|---|---|---|---|---|---|---|---|
| MSC A | 0 | 0 | 80 | 120 | 80 | 0 | 0 |
| MSC B | 0 | 0 | 0 | 80 | 120 | 80 | 0 |
| MSC C | 80 | 0 | 0 | 0 | 80 | 120 | 0 |
| MSC D | 120 | 80 | 0 | 0 | 0 | 80 | 0 |
| MSC E | 80 | 120 | 80 | 0 | 0 | 0 | 0 |
| MSC F | 0 | 80 | 120 | 80 | 0 | 0 | 0 |
| MSC G | 0 | 0 | 0 | 0 | 0 | 0 | 0 |

306

SYSTEM AND METHOD FOR DETECTING CLONING FRAUD IN CELLULAR/PCS COMMUNICATIONS

BACKGROUND OF THE INVENTION

1. Field of the Invention

The present invention relates generally to cellular/PCS (Personal Communications Services) telephone communications. Specifically, the present invention relates to detecting cloning fraud in a cellular/PCS environment.

2. Related Art

Cellular mobile telephone systems provide direct-dial telephone service to mobile users by using radio transmission. The service area of a cellular mobile telephone system is divided into regions called cells. Within each cell is a base station which includes a transmitter and a receiver. Each base station is connected to a mobile switching center (MSC) which processes calls to and from mobile users located in the cell. Each transmitter and receiver operates on a voice channel (frequency). A single channel may be used for many simultaneous conversations (voice signals) in cells which are sufficiently separated from one another such that excessive interference is avoided. However, as the number of mobile users increases within a cell, the cell may become too crowded to provide adequate separation. When a cell becomes overcrowded, the cell must be split into smaller cells with each cell covering a smaller geographic area. Each new cell requires a new base station which is connected to the original MSC. Thus, as the number of cells increases, each MSC may be processing calls for multiple cells.

As a mobile user travels with his cellular telephone powered up, the cellular telephone autonomously registers the mobile user by sending signals with information identifying the mobile user to the MSC serving the cell where the mobile user is currently located. The sending and receipt of such information is referred to as registration notification. The information included in a registration notification is the mobile user's mobile identification number (MIN) and an electronic serial number (ESN). The MIN uniquely identifies each mobile user in a manner similar to a conventional telephone number. The ESN is encoded into each cellular telephone. The ESN functions as a security password verifying the validity of the MIN and allowing the mobile user access to the cellular mobile telephone system.

The MSC collects registration notifications and provides them to other facilities in the cellular mobile telephone system. These facilities primarily use the registration notifications to facilitate incoming and outgoing calls. Typically, a mobile user subscribes for services with the MSC covering the cell, or group of cells, where the mobile user primarily resides or conducts business. This MSC is referred to as the mobile user's home MSC. All other MSCs in the cellular mobile telephone system are known as visited MSCs with respect to the mobile user. When a mobile user ventures beyond the cells covered by the home MSC, the mobile user is said to be "visiting." For purposes of this discussion, a mobile user inside a cell of a visited MSC is referred to as a visiting mobile user.

When a mobile user powers on his cellular telephone or crosses cell boundaries covered by different MSCs, the cellular telephone, at some point, autonomously sends a signal representing a registration notification. The MSC covering the cell (i.e., either a home MSC or a visited MSC) receives the registration notification. Based on the MIN and ESN contained in the registration notification, the MSC queries a Roamer Validation and Call Delivery (RVCD) facility to validate the mobile user's subscription information. The RVCD stores the subscription information for all mobile users in the cellular mobile telephone system in a Home Location Register (HLR). The HLR identifies each of the mobile users home MSC, the services to which each mobile user is subscribed, and whether each subscription is valid.

After receiving a query from the MSC, the RVCD responds by sending the requested the information included in the HLR back to the querying MSC. The MSC maintains this information to provide cellular mobile telephone services to the mobile user as long as the mobile user remains in cells covered by the MSC.

Registration notification is important for several reasons. Primarily, registration notification is used to provide cellular mobile telephone services to mobile users outside of the cells of the home MSC (as described above). Thus, a mobile user can utilize cellular mobile telephone services throughout the cellular mobile telephone system.

Registration notification is also important for routing incoming calls to mobile users. When an incoming call is to be routed to a mobile user, the mobile user must be located so that the call can be routed through the proper MSC to the mobile user. In the case of a conventional telephone user (i.e., not a mobile user) attempting to place a call to a mobile user, the home MSC receives the incoming call from the regular telephone user and determines whether the mobile user is active, or operating, in the cell of the home MSC. If the mobile user is not active within the cell of the home MSC, the mobile user may: 1) not have his telephone powered up, or 2) be active in the cell of a visited MSC. In the first case, the incoming call cannot be routed to the mobile user. In the second case, the RVCD attempts to locate the mobile user within the cellular telephone system.

The RVCD functions as a clearing house for a cellular mobile telephone system. Specifically, the RVCD validates mobile users and manages activation, deactivation, and changes in subscription profiles of mobile users. The RVCD also stores a copy of each registration notification received from the MSCs. Furthermore, the RVCD updates the HLR to indicate the MSC where the latest registration notification originated (this is called the originating MSC). This allows the RVCD to track where each mobile user is currently located in the cellular mobile telephone system.

Tracking mobile users within the cellular mobile telephone system serves to facilitate the routing of incoming calls to mobile users. When an incoming call is placed to a mobile user who is not within the cell of the home MSC, the home MSC can query the RVCD to locate the mobile user based on the origination of the registration notification maintained in the HLR. The the incoming call can then be routed to the originating MSC which connects the incoming call via radio communication signals to the mobile user. In the preferred embodiment, two RVCD systems are used in parallel to provide backup for the cellular mobile telephone system in case one RVCD should fail.

A problem existing in current cellular mobile telephone systems is cloning fraud. Cloning fraud occurs when one mobile user (called an unauthorized user) obtains and fraudulently uses the MIN and ESN registered to another mobile user (called an authorized user) in order to obtain "free" service. As used herein, the term "valid MIN" refers to a MIN when being used by an authorized mobile user. The term "cloned MIN" refers to a MIN when being used by an unauthorized mobile user.

The cellular mobile telephone system uses the MIN and ESN associated with each mobile telephone call to bill the authorized mobile user registered with that MIN and ESN. When a MIN and ESN are "cloned", the authorized mobile user gets billed for calls made with the valid MIN as well as those calls made using the cloned MIN. Cloning fraud costs the cellular telephone industry millions of dollars in lost revenue each year. What is needed is a means for detecting cloning fraud in a cellular/PCS environment.

SUMMARY OF THE INVENTION

The present invention is directed to a system 200 and method for proactively detecting cloning fraud in a cellular/PCS (Personal Communications Services) environment. According to the invention, the system detects cloning fraud by comparing the time and location of registration notifications having the same mobile identification number (MIN). Cloning fraud is reported when the computed time difference between such registration notifications is less than a reasonable travel time between the cells of the originating mobile switching centers (originating MSCs).

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

FIG. 6. illustrates an example clone detection table used by the invention.

DETAILED DESCRIPTION OF THE EMBODIMENTS

Figure 1:
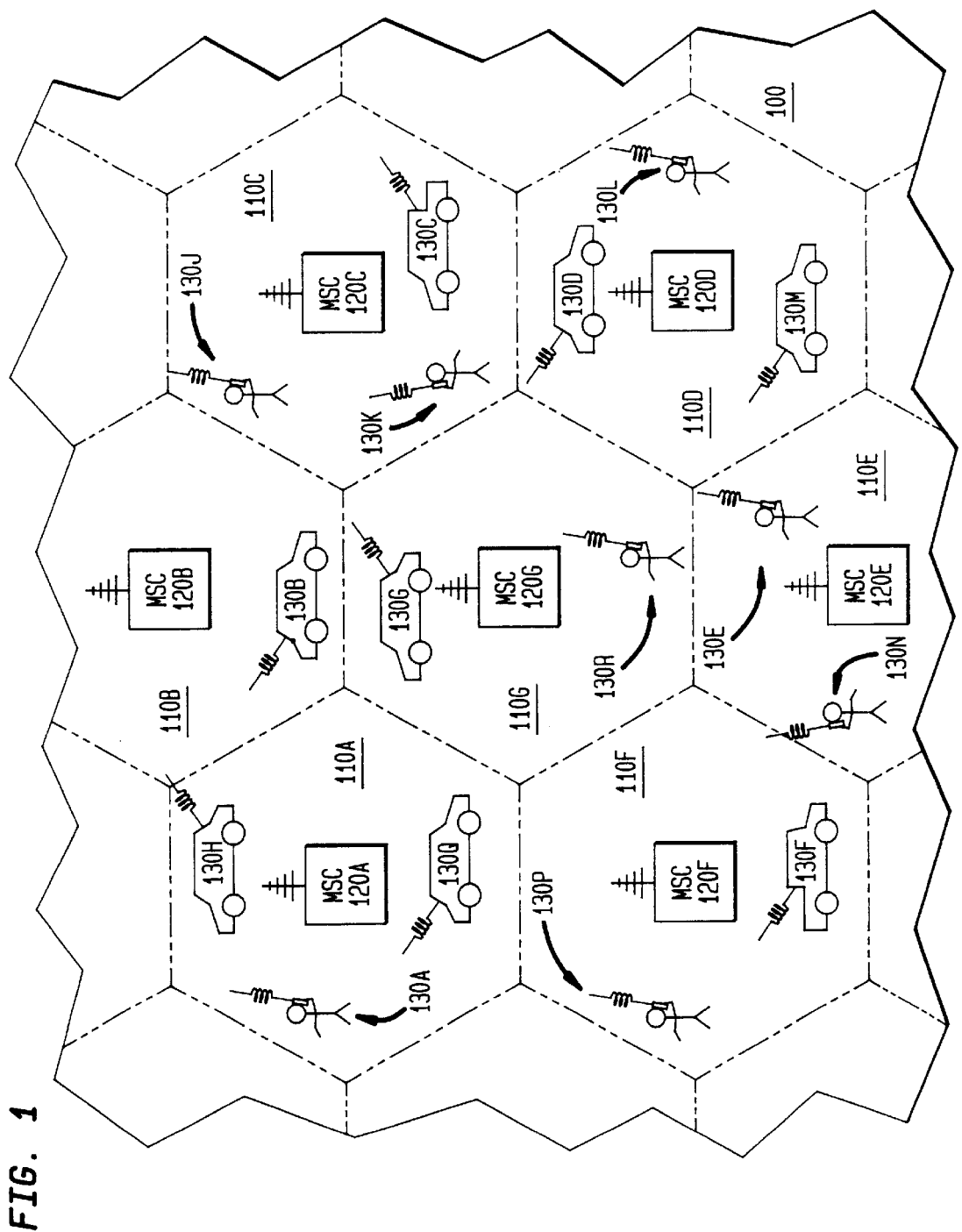
FIG. 1 illustrates a cellular mobile telephone environment.

FIG. 1 illustrates a cellular mobile telephone environment 100. Cellular mobile telephone environment 100 includes a plurality of cells 110. Each cell 110 includes a base station (not shown) for transmitting and receiving radio signals to and from mobile users 130. Each base station is connected to a mobile switching center (MSC) 120. One or more mobile users 130 may be positioned in each cell 110 at any time. For ease of discussion, it is assumed that each MSC 120 is connected to one base station, and that each MSC 120 covers one cell 110. However, it will be apparent to one skilled in the art that such a limitation is unnecessary. In fact, each MSC 120 is usually connected to several base stations, and thus, is responsible for covering multiple cells 110.

Figure 2:
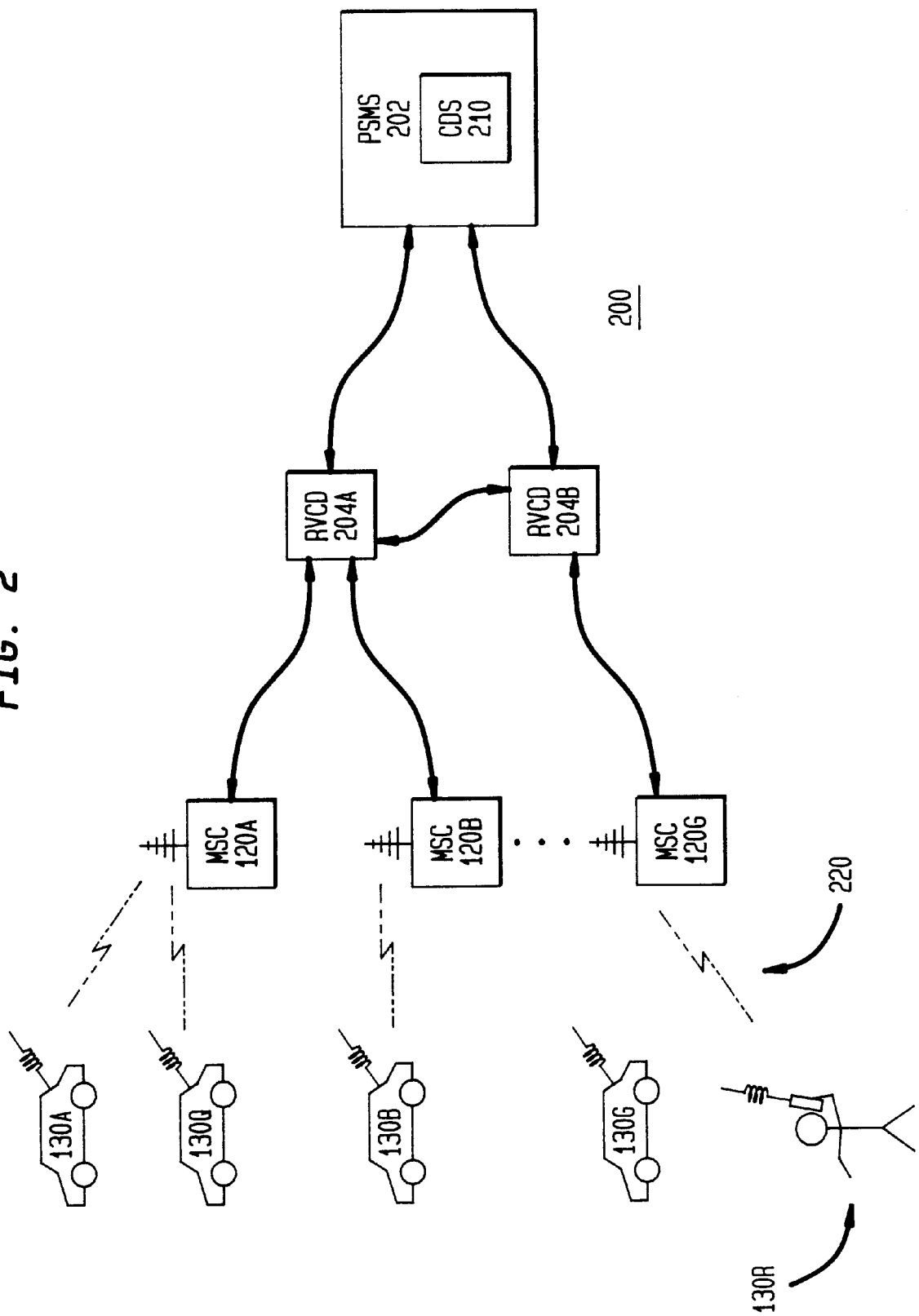
FIG. 2 illustrates a block diagram of a cellular mobile telephone system according to a preferred embodiment of the present invention.

FIG. 2 illustrates a block diagram of a cellular mobile telephone system 200 according to a preferred embodiment of the present invention. Cellular mobile telephone system could comprise a nationwide telephone system. Cellular mobile telephone system 200 includes a PCS Service Management System (PSMS) 202, a first Roamer Validation and Call Delivery system (RVCD) 204A, a second RVCD 204B, a plurality of MSCs 120, and a plurality of mobile users 130. As discussed above, a base station (not shown) is positioned in each cell 110. Each base station is connected to a MSC 120. An MSC 120 may be connected to one or more base stations thus covering one or more cells 110. Each of the MSCs 120 is connected to either RVCD 204A or RVCD 204B, which are centrally located within cellular mobile telephone system 200. The RVCDs 204 are connected to each other to provide rerouting in the event that one fails. Both RVCDs 204 are connected to PSMS 202 which is also centrally located within cellular mobile telephone system 200. In the preferred embodiment, the MSCs 120 are connected to the RVCDs 204 using IS-41 protocol over SS7 or X.25. The RVCDs 204 are connected to the PSMS 202 via an X.25 packet network. A person skilled in the art will recognize that other connection protocols and networks may alternatively be used.

In general, a mobile user 130 registers with a MSC 120 by sending its MIN and ESN using well known wireless communication techniques (i.e., via a radio signal 220). Radio signal 220 containing mobile user's MIN and ESN is sent at a predetermined time interval while the mobile user 130 is operating to notify the MSC 120 of its presence within the cell 110 where the MSC 120 is located. This is referred to as registration notification. The MSC 120 receives the radio signal 220 as a registration notification (REGNOT) query. A REGNOT query includes a MIN, a time stamp representing a time when the registration notification was received by the MSC 120, and an originating MSC indicia identifying which MSC 120 received the registration notification. The MSC 120 sends the REGNOT query to one of the RVCDs 204 which processes the REGNOT query and creates a record of the query for subsequent retrieval by PSMS 202 (described below).

For example, at 10:30 am, a mobile user 130G operating in a cell 110G sends a radio signal 220 containing a registration notification. The MSC 120G receives the signal 220 and creates a REGNOT query. The REGNOT query includes the mobile user 130G's MIN, a time stamp of 10:30 am (i.e., the time when the registration notification was received), and an originating MSC indicia identifying MSC 120G (i.e., the identity of the MSC receiving the registration notification). The REGNOT query is sent to either RVCD 204A or RVCD 204B which stores the query as a REGNOT record.

As discussed previously, each RVCD 204 functions as a clearing house for the cellular mobile telephone system 200 by maintaining information regarding the mobile users 130. This information includes the cellular mobile telephone services to which each mobile user 130 subscribes and the cell where each operating mobile user 130 is currently located. RVCDs 204 maintain this information in a master list referred to as a Home Location Register (HLR). The information regarding the cell where each operating mobile user 130 is currently located is updated from REGNOT queries received from the MSCs 120. At a predetermined time interval (i.e. determined by individual system implementation requirements), each RVCD 204 sends the REGNOT records to the PSMS 202 which performs various processing of the information. The PSMS 202 includes a clone detection system (CDS) 210 which processes the REGNOT records to identify instances of cloning fraud.

Figure 3:
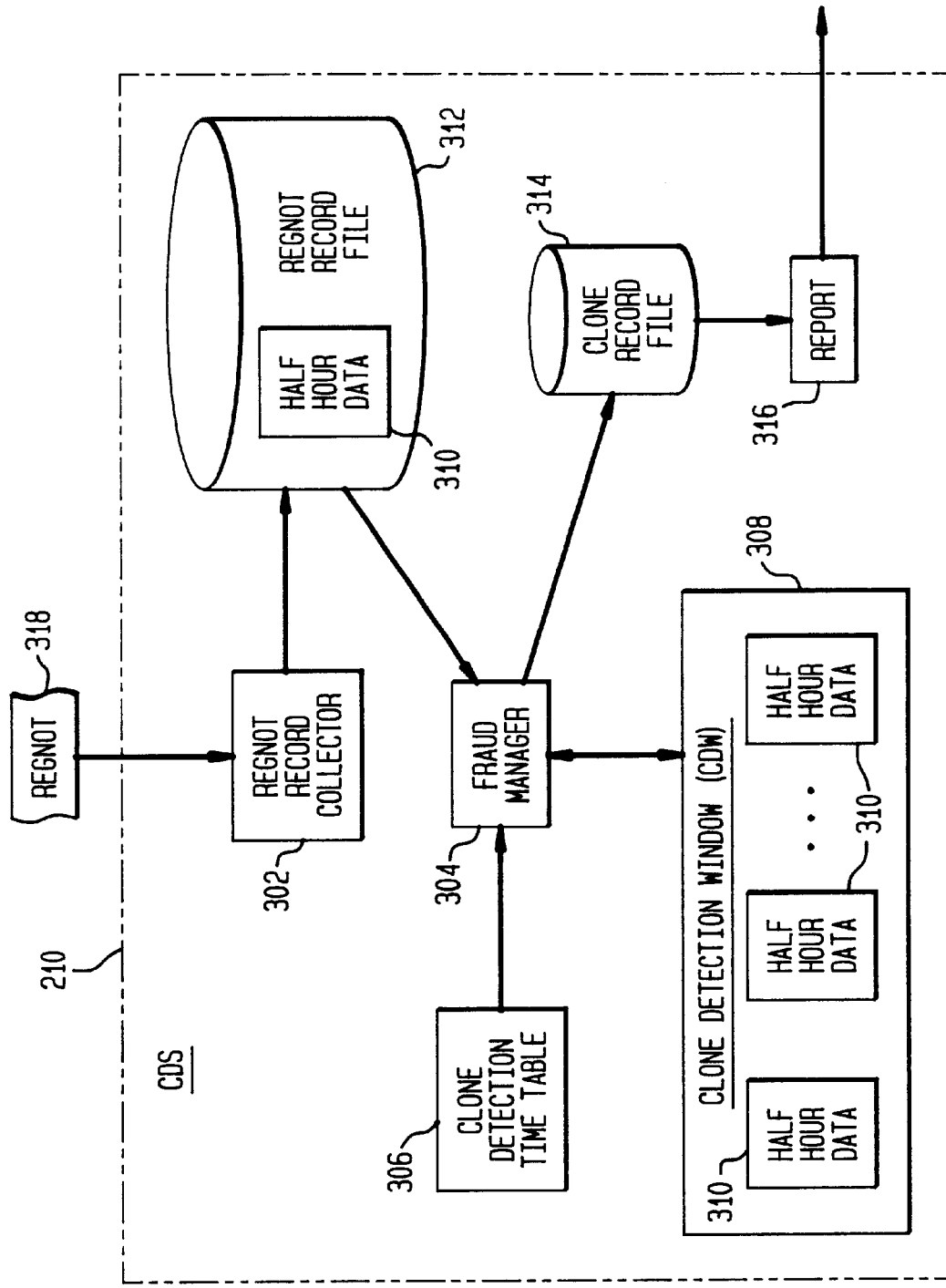
FIG. 3 illustrates a block diagram of a clone detection system (CDS) according to a preferred embodiment of the present invention.

FIG. 3 illustrates a block diagram of the clone detection system (CDS) 210 according to a preferred embodiment of the present invention. The CDS 210 includes a REGNOT record collector 302, a REGNOT record file 312, a fraud manager 304, a clone detection time table 306, a clone detection window 308, a clone record file 314, and a report generator 316.

The PSMS 202 receives the REGNOT records, indicated by reference number 318 in FIG. 3, from the RVCDs 204. The REGNOT record collector 302 collects these REGNOT records 318 and stores them in the REGNOT record file 312. In the preferred embodiment, the PSMS 202 receives new REGNOT records 318 from the RVCDs 204 every thirty minutes. The REGNOT records 318 received during each thirty minute interval are stored in the REGNOT record file 312 as a group. Each group of REGNOT records 318 so stored is referred to as a "half hour data group" 310.

Fraud manager 304 collects several half hour data groups 310 from the REGNOT record file 312 and forms a clone detection window 308 (such half hour data groups 310 are stored in memory, such as random access memory). The clone detection window 308 collectively represents all registration notifications (represented by REGNOT records 318) received by the MSCs 120 within the cellular mobile telephone system 200 during a predetermined time frame. In the preferred embodiment, the fraud manager 304 forms a clone detection window 308 from the most recent thirteen half hour data groups 310 arranged from oldest in time to newest in time. Accordingly, the clone detection window 308 represents all registration notifications received within the past 6.5 hours by all MSCs 120 in the cellular mobile telephone system 200.

Clone detection window 308 is a sliding window, representing registration notifications occurring within a specified time interval (i.e. the last 6.5 hours). As the window "slides" (i.e. time passes), new registration notifications are added to the window and old ones are removed. Thus, only those registration notifications occurring within the specified time interval are processed together by fraud manager 304.

The fraud manager 304 determines whether cloning fraud exists by determining whether time-space peculiarities exist within the clone detection window 308. A time-space peculiarity exists when registration notifications with the same MIN originated in different locations within a time insufficient to travel between the different locations. In such cases, at least one of the registration notifications is likely to be an instance of cloning fraud.

In the preferred embodiment, the fraud manager 304 detects cloning fraud by comparing the difference between the time stamps of the REGNOT records 318 in the clone detection window 308 having the same MIN with a reasonable travel time between the locations of the cells of the originating MSCs. For example, referring to FIG. 1, suppose the MSC 120A receives a registration notification indicating a MIN of X from the mobile user 130A at 10:00 a.m. Later, the MSC 120C receives a registration notification also indicating a MIN of X from the mobile user 130C at 10:45 a.m. Suppose that a reasonable travel time between cell 110A and cell 110C is 80 minutes. When the fraud manager 304 processes the REGNOT records 318 in the clone detection window 310, it will locate these two registration notifications having the same MIN of X. The fraud manager 304 will determine that one registration notification was received by the MSC 120A in cell 110A while the other was received by the MSC 120C in cell 110C. The fraud manager 304 will determine that the registration notifications occurred 45 minutes apart from one another. By comparing this time difference (45 minutes) with the reasonable travel time (80 minutes), the fraud manager 304 will conclude that an instance of cloning fraud has occurred.

The previous example has been provided to illustrate the operation of the clone detection system 210 and not as a limitation. In the preferred embodiment, the clone detection window 308 is 6.5 hours wide (chosen as the minimum reasonable time to travel across the United States) and encompasses a much larger time frame than the example illustrates. Furthermore, it would be apparent for one skilled in the art to adjust the width of the clone detection window 308 depending on the geographic area covered by the cellular mobile telephone system 200.

Referring again to FIG. 3, in the preferred embodiment, reasonable travel times between the cells 110 covered by different MSCs 120 of the cellular mobile telephone system 200 are stored in a clone detection time table 306. The clone detection time table 306 includes the reasonable travel time between cells 110 covered by a pair of MSCs 120. For cells 110 covered by a pair of adjacent MSCs 120 (e.g., MSC 120A and MSC 120B), the travel time is zero because a mobile user 130 could register with either MSC 120 as the mobile user 130 crosses cell boundaries. For each pair of nonadjacent MSCs 120 (e.g., MSC 110A and MSC 110D), a reasonable travel time is determined based on the time a mobile user 130 would take to travel out of cells 110 covered by a first MSC 120 and into cells 110 covered by a second MSC 120. This reasonable travel time is stored in clone detection time table 306 and is retrieved using the originating MSC from each of the REGNOT records as indices into the table. An example clone detection time table 306 is illustrated in FIG. 6. For example, the reasonable travel time between cells 110 covered by MSCs 120A and 120D is found by using the first REGNOT originating MSC as MSC A and the second REGNOT originating MSC as MSC D to retrieve 120 minutes as the reasonable travel time.

The preferred embodiment uses RVCDs 204 to store the HLR and collect the REGNOT queries for each of the MSCs 110. One skilled in the art would recognize that other implementations or divisions of processing could be utilized for clone detection system 210. For example, the PSMS 202 could be directly connected to each MSC 110 and handle the registration notifications without any RVCDs 204. Furthermore, data could be processed in other that half hour increments, or in fact, immediately upon receipt.

Figure 4:
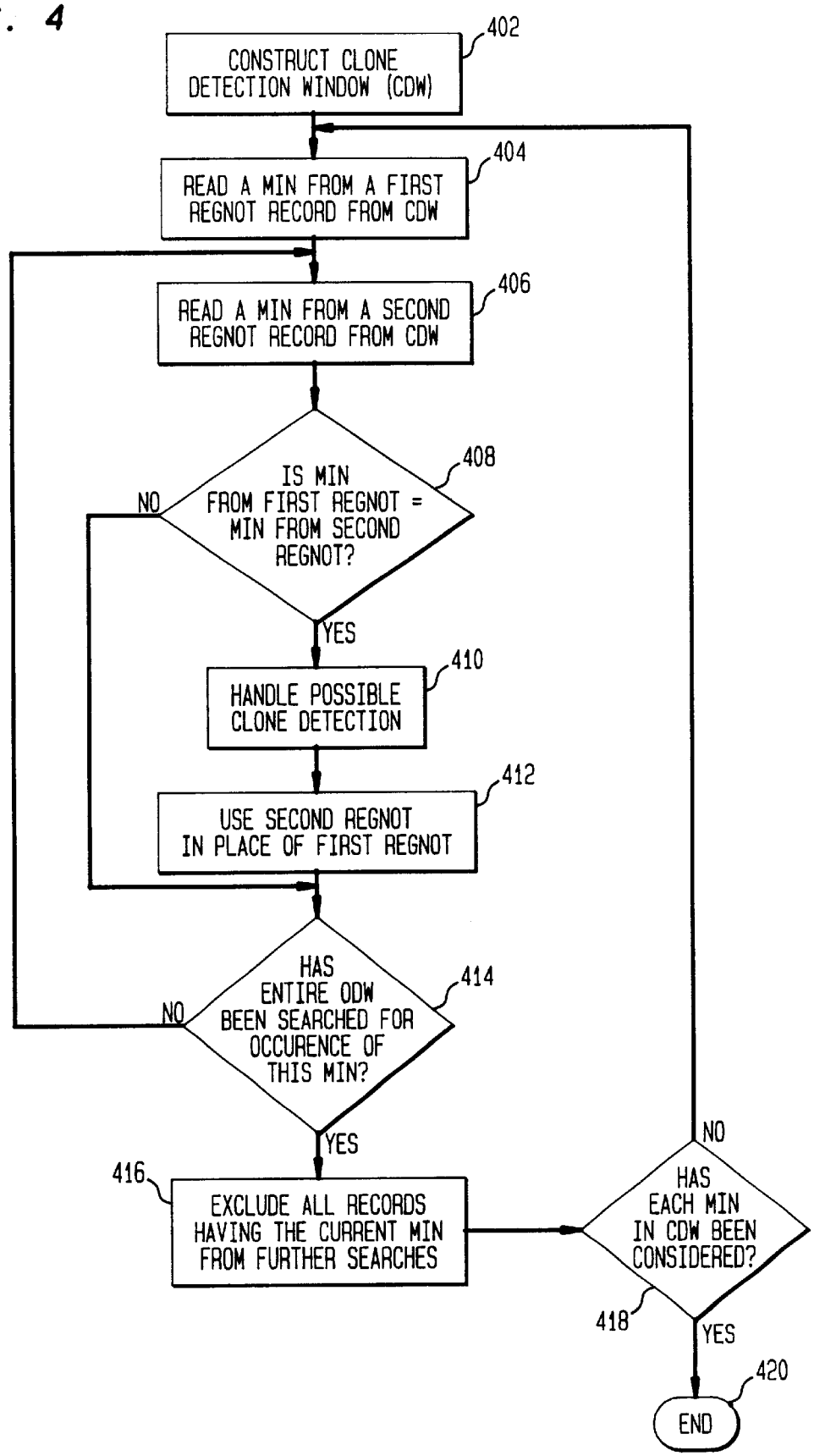
FIGS. 4 and 5 are flow charts depicting the preferred operation of the present invention.

FIG. 4 illustrates a flow diagram of a preferred implementation of the processing performed by the fraud manager 304 during clone detection. In a step 402, the fraud manager 304 forms a clone detection window 308 from preferably the most recent in time thirteen half hour data groups 310 retrieved from REGNOT record file 312. As discussed above, the data is arranged from the oldest REGNOT record to the newest REGNOT record.

In a step 404, the fraud manager 304 reads a MIN from a first REGNOT record 318, (i.e., the oldest record with respect to time) in the clone detection window 308. In a step 406, the fraud manager 304 reads a MIN from a second REGNOT record 318 in clone detection window 308. In a decision step 408, the fraud manager 304 compares the MIN from the first REGNOT record with the MIN from the second REGNOT record to determine if the MINs are the same. If the MINs are the same (indicating the same registered mobile user), processing continues at a step 410; otherwise, processing continues at a decision step 414.

In step 410, the fraud manager 304 handles a possible clone detection, as discussed in greater detail below. After handling a possible clone detection, the fraud manager 304, in a step 412, notes that it should use the second REGNOT record in place of the first REGNOT record in future performances of step 408 and 410, so that future occurrences of the same MIN will be compared (in step 502, as described below) with the time stamp of the second REGNOT record rather than that of the first.

In decision step 414, the fraud manager 304 determines whether the entire clone detection window 308 has been searched for the occurrence of the MIN obtained in step 404. If the entire clone detection window 308 has been searched, processing continues at a step 416; otherwise, processing returns to step 406 to get a new second REGNOT record 318 from the clone detection window 308 and continue searching for the same MIN.

In step 416, the fraud manager 304 excludes from further consideration all REGNOT records 318 having the MIN obtained in step 404. In a step 418, the fraud manager 304 determines whether any REGNOT records 318 remain in the clone detection window 308 that contain MINs that have not yet been checked for cloning fraud. If no REGNOT records 318 remain to be checked, processing ends in a step 420; otherwise, processing returns to step 404 to get a new first REGNOT record 318 containing a new MIN to check for cloning fraud.

Figure 5:
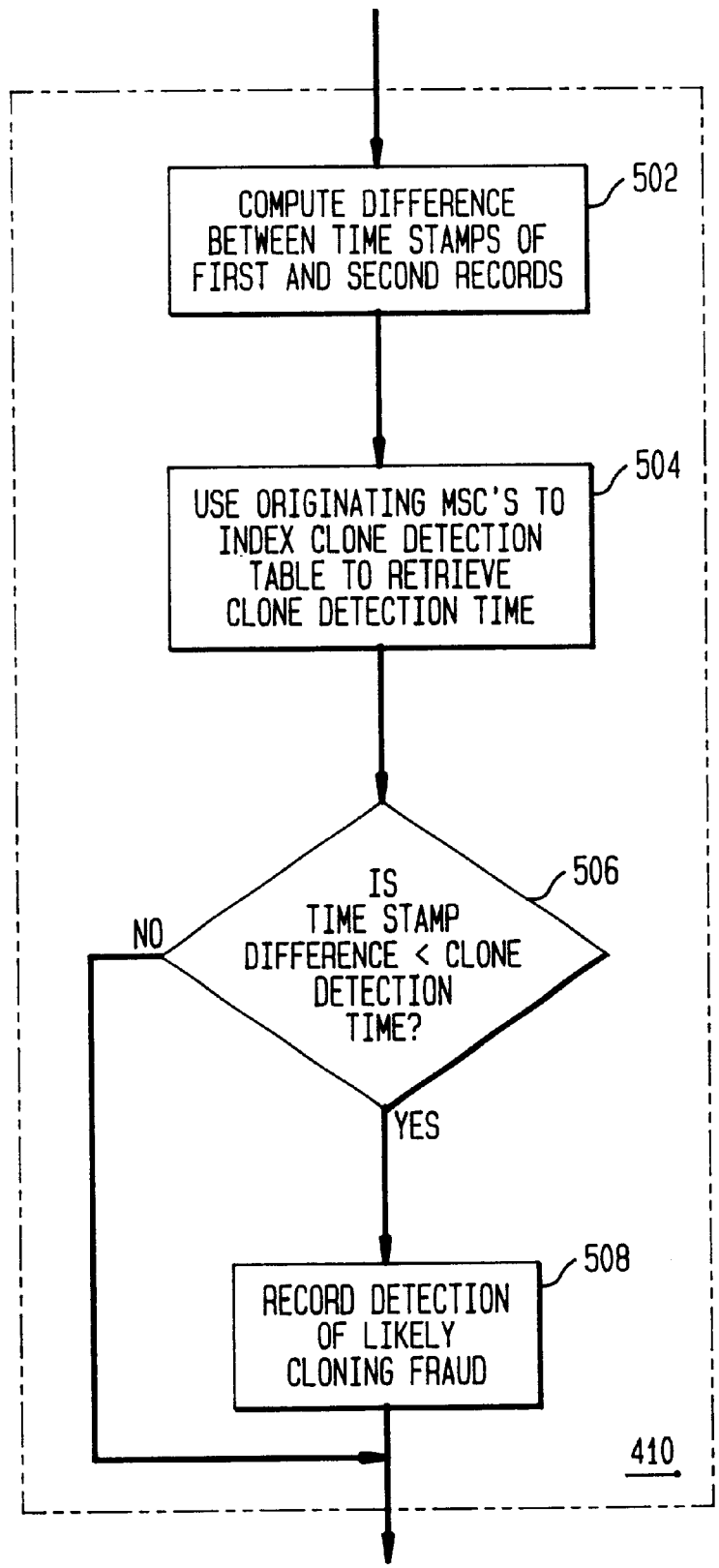

FIG. 5 illustrates the handling of possible clone detection of step 410 in greater detail. In a step 502, the fraud manager 304 computes a difference between time stamps of the first and second REGNOT records. In a step 504, the fraud manager 304 obtains the indicia identifying the originating MSCs from the first and second REGNOT records and uses them as indices to the clone detection time table 306 to retrieve a reasonable travel time between the respective cells of originating MSCs. In a decision step 506, the fraud manager 304 determines whether the time stamp difference obtained in step 502 is less than the reasonable travel time obtained from the clone detection time table 308 in step 504. If the time stamp difference is less than the reasonable travel time, then cloning fraud is likely to exist and processing continues at a step 508; otherwise, the handling of possible clone detection is complete (i.e., cloning fraud does not exist) and processing continues at step 412.

In step 508, the fraud manager 304 records a likely instance of cloning fraud in the clone record file 314. The fraud manager stores the MIN, both originating MSCs, the clone detection time, and the time stamp difference for later action/reporting by the clone detection system 210. In addition to a daily report of cloning activity, such action/reporting may include an alarm displayed to personnel in cellular mobile telephone system 200 or removal of the suspected clone from service. After step 508, processing continues at step 412.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for proactively detecting cloning fraud in a mobile cellular telephone environment, comprising the steps of:
    (1) collecting a plurality of registration notifications each represented by a registration notification (REGNOT) record comprising a mobile identification number (MIN), a time stamp of said registration notification, and originating indicia identifying a cell where said registration notification originated;
    (2) detecting a first REGNOT record and a second REGNOT record having a common MIN;
    (3) computing a time difference between time stamps of said first and second REGNOT records; and
    (4) determining whether cloning fraud involving said common MIN has occurred based on said time difference.

2. The method of claim 1, wherein step (4) comprises the step of comparing said time difference to a clone detection time corresponding to a time needed to travel between cells identified by originating indicias contained in said first and second REGNOT records.

3. The method of claim 2, wherein said clone detection time is stored in a clone detection time table and retrieved using said originating indicias contained in said first and second REGNOT records as indices into said clone detection time table.

4. The method of claim 1, wherein the plurality of REGNOT records are received from a plurality of RVCDs.

5. A method for proactively detecting cloning fraud in a mobile cellular telephone environment, comprising the steps of:
    (1) storing a plurality of registration notifications each represented by a registration notification (REGNOT) records, each REGNOT record comprising a mobile identification number (MIN), a time stamp of said registration notification, and originating indicia identifying a cell where said registration notification originated;
    (2) forming a clone data window comprising a plurality of said REGNOT records occurring within a predetermined time frame;
    (3) detecting in said clone data window a first REGNOT record and a second REGNOT record having a common MIN;
    (4) computing a time difference between time stamps of said first and second REGNOT records;
    (5) determining whether cloning fraud involving said common MIN has occurred based on said time difference; and
    (6) recording said occurrence of cloning fraud involving said common MIN.

6. The method of claim 5, wherein step (5) comprises the step of comparing said time difference to a clone detection time corresponding to a time needed to travel between cells identified by originating indicias contained in said first and second REGNOT records.

7. The method of claim 6, wherein said clone detection time is stored in a clone detection time table and retrieved using said originating indicias contained in said first and second REGNOT records as indices into said clone detection time table.

8. The method of claim 7, wherein said clone detection window is formed every 30 minutes and said predetermined time frame is the previous 6.5 hours.

9. The method of claim 5, wherein the plurality of REGNOT records are received from a plurality of RVCDs.

10. A computer-based system for proactively detecting cloning fraud in a mobile cellular telephone environment, comprising:
    storing means for storing a plurality of registration notifications each represented by a registration notification (REGNOT) record, each REGNOT record comprising a mobile identification number (MIN), a time stamp of said registration notification, and originating indicia identifying a cell where said registration notification originated;
    detecting means for detecting a first REGNOT record and a second REGNOT record having a common MIN;

computing means for computing a time difference between time stamps of said first and second REGNOT records;

means for determining whether cloning fraud involving said common MIN has occurred based on said time difference; and reporting means for reporting said occurrence of cloning fraud involving said common MIN.

11. The system of claim 10, wherein said means for determining cloning fraud comprises comparing said time difference to a clone detection time corresponding to the time needed to travel between cells identified by originating indicias contained in said first and second REGNOT records.

12. The system of claim 11, wherein said clone detection time is stored in a clone detection time table and retrieved using said originating indicias contained in said first and second REGNOT records as indices into said clone detection time table.

13. The system of claim 10, further comprising means for accepting a plurality of REGNOT records from a plurality of RVCDs.

14. A method for proactively detecting cloning fraud in a mobile cellular telephone environment, comprising the steps of:

receiving a plurality of registration notifications each having a mobile identification number for identifying a mobile user in the mobile cellular telephone environment;

obtaining a time stamp and an originating indicia for each of said plurality of registration notifications, wherein said time stamp indicates when and said originating indicia indicates where each of said plurality of mobile identification numbers was received; and determining whether an instance of cloning fraud has occurred based on said time stamps and said originating indicias of two of said plurality of registration notifications having a same mobile identification number.

15. The method of claim 14, wherein said step of determining comprises:

computing a time difference between time stamps of said two of said plurality of registration notifications having the same mobile identification number; and comparing said time difference to a time needed to travel between said cells indicated by said originating indicias.

16. The method of claim 14, wherein the plurality of REGNOT records are received from a plurality of RVCDs.

17. A method for detecting cloning fraud in a mobile telephone environment, comprising the steps of:

receiving a plurality of registration notification each identifying a same particular mobile user; and determining, as a function of a time of creation of each of said plurality of registration notifications and a location identified as the location of a mobile telephone that caused the creation of each of said plurality of registration notifications, whether an instance of cloning fraud has occurred.

18. The method of claim 17, wherein the plurality of REGNOT records are received from a plurality of RVCDs.

19. A method for detecting cloning fraud in a mobile telephone environment, comprising the steps of:

receiving a plurality of registration notifications identifying a same particular mobile user;

obtaining a creation time and an originating location for each of said plurality of registration notifications; and determining whether cloning fraud has occurred based on said creation times and said originating locations.

20. The method of claim 19, wherein the plurality of REGNOT records are received from a plurality of RVCDs.

* * * * *